United States Patent
Kishinsky et al.

(12)
(10) Patent No.: US 6,178,239 B1
(45) Date of Patent: *Jan. 23, 2001

(54) TELEPHONY CALL-CENTER SCRIPTING BY PETRI NET PRINCIPLES AND TECHNIQUES

(75) Inventors: Konstatin Kishinsky, San Carlos; Nikolay Anisimov, Walnut Creek, both of CA (US)

(73) Assignee: Genesys Telecommunications Laboratories Inc., San Francisco, CA (US)

(*) Notice: Under 35 U.S.C. 154(b), the term of this patent shall be extended for 0 days.

This patent is subject to a terminal disclaimer.

(21) Appl. No.: 09/506,113

(22) Filed: Feb. 17, 2000

Related U.S. Application Data

(62) Division of application No. 09/036,006, filed on Mar. 4, 1998, now Pat. No. 6,067,357.

(51) Int. Cl.[7] .......................... H04M 3/523; H04M 3/42; G05B 19/418

(52) U.S. Cl. .......................... 379/265; 379/201; 379/900; 700/95

(58) Field of Search .................................. 379/201, 207, 379/265, 266, 309, 900; 700/95

(56) References Cited

U.S. PATENT DOCUMENTS

| | | | | |
|---|---|---|---|---|
| 5,555,179 | * | 9/1996 | Koyama et al. | 700/95 |
| 5,655,015 | * | 8/1997 | Walsh et al. | 379/265 X |
| 5,832,070 | * | 11/1998 | Bloom et al. | 379/265 |
| 5,933,492 | * | 8/1999 | Turovski | 379/201 X |
| 6,067,357 | * | 5/2000 | Kishinsky et al. | 379/265 |

* cited by examiner

*Primary Examiner*—Harry S. Hong
(74) *Attorney, Agent, or Firm*—Donald R. Boys; Central Coast Patent Agency

(57) ABSTRACT

A call center management system comprises a graphical user interface (GUI) adapted for modeling call center behavior, and the behavior of objects within a call center, as Petri Net directed graphs. Once developed, the Petri Net graphs can be compiled as software modules for use in CTI management of a call center. In another aspect the composed Petri Nets are assembled into high-level Petri Nets, and a Petri Net engine is employed to manage a call center. Management techniques and concepts taught are extended to network management as well.

15 Claims, 6 Drawing Sheets

TELEPHONY CALL-CENTER SCRIPTING BY PETRI NET PRINCIPLES AND TECHNIQUES

CROSS-REFERENCE TO RELATED DOCUMENTS

The present patent application is a Divisional application of patent application 09/036,006 filed on Mar. 4, 1998, now U.S. Pat. No. 6,067,357.

FIELD OF THE INVENTION

The present invention is in the area of telephony call-center technology, and pertains more particularly to methods of programming and directing activities of call-centers with aid of computer integration.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts and teaching of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone call-center systems, and several manufacturers and service providers are developing and introducing systems with enhanced functionality, principally through what is known in the art as computer-telephony integration (CTI). CTI systems are typically based on telephony switches connected by what are known as CTI links to relatively powerful computer processors executing telephony applications. As is known in the art, conventional telephony switches are electronic systems operating partly with computer hardware and software with a functionality set generally unique to the manufacturer and model of the individual switch. Many telephony switches have at least one external communication port known in the art as a CTI port which is adapted to connect to an external computer processor, and it is via this connectivity that CTI is accomplished.

Generally speaking, a CTI-enhanced telephony switch has a processor connected by a CTI link to the switch, and the processor is adapted to execute telephony CTI applications to monitor and direct activity of the switch New invention of CTI-enhanced systems is limited only by the power of the computers used and the imagination and creativity of the technical people who invent new telephony systems through creating unique CTI applications.

The general purpose of a call-center, as is known in the art, is to connect agents representing the sponsor (owner, operator) of the call center with members of the public (people interested in accessing the services of the call center). Typically a call center is based, as described above, on at least one telephony switch to which agent stations are connected typically by extension lines and directory numbers, and to which incoming and out-going trunk lines may carry telephone calls between the switch and the calling-in parties. In addition, most modern, high-capacity call centers have agent stations which include computer platforms (such as personal computers) equipped with video display units (PC/VDU), and the PC/VDU platforms are interconnected, usually by a local area network (LAN). There may also be servers of various sorts for various purposes on the LAN, and the LAN may also be connected to a CTI server in turn connected to the central switch through a CTI link.

In call-center operation calls may be initiated either from the public (client) side or by agents at the call center. An example of a call-Center wherein calls are initiated principally by the public are those in which an organization is providing a service, such as a company that sells electronic products, and the company is using the call-center approach to provide technical service to the public in installing and troubleshooting the company's products. An example of a call-center wherein most calls would be initiated by agents is a center wherein an organization is conducting a sales effort, and agents are targeting potential customers from any existing customer list, or even randomly. There are many, many examples of each type of call center, but service centers are probably most prevalent wherein organizations are providing some service to a usually pre-existing customer or client base. More detailed examples of call-center architecture is provided below in conjunction with more detailed description of preferred embodiments of the present invention.

To avoid confusion, in this specification persons placing calls to a call center, or to whom calls may be placed by agents or automatic equipment at a call center, will be termed clients of the call center. Agents will continue to be called agents.

Regardless of the nature of a call center or the nature of the business to be conducted, there is always a purpose to the transactions conducted between the agents and the clients. Moreover, the transactions between an agent and a client may be relatively complex. For this and other reasons, the organization (usually a business) conducting or hosting a call center (hereinafter host) has an interest in managing the activity of the agents in a manner to produce effective and efficient results. The agents are, after all, usually employees of the host.

In virtually all call-center operations, a considerable investment in training must be made where the agents are involved, because the agents have to be ready to provide the information the clients need. Moreover, call-center operations are dynamic in the sense that new products may be developed, new problems may accrue for which clients need information, and so on. So agent training is an ongoing requirement, even for welltrained and experienced agents.

Still further, given the nature of the call-center wherein an agent is engaged, in any interaction with a client, there are typically numerous decision points, at which the flow of interaction may take one or another of divergent paths. For example, a call may be inadvertently routed to an agent not qualified to handle the call. The call then has to be re-routed to another agent. Also, in interaction with a client, some determination may be made requiring re-routing of a call. In stock sales, for example, some transactions may have to be handled by a licensed person.

Given a call-center wherein agent stations include LAN-connected PC/VDU equipment and CTI-enhancement, an opportunity presents itself for directing activity of agents in a particularly efficient way; that is, scripts may be prepared for agent activity, for hardware activity (call switching and so forth), and even for interaction of agents with clients and hardware. The scripts may be maintained in, for example, a server on the LAN connecting agent's PC/VDU platforms, and direction may be thus provided to agents and activities of a call center before, during, and after calls with clients.

The present invention is directed toward call-center management, and in specific aspects directed toward scripting for call-centers. In conventional art, scripts are provided, as described above, from preprogrammed sources to agents through associated PC/VDU platforms. In providing scripts, it is necessary for a scripter (a programmer who writes and/or programs scripts) to analyze all of the transactions that might take place between an agent and a client, including what might be termed machine activity, such as switching a client's call from one agent to another, or to a source of preprogrammed audio, video, or textual information.

Scripts are programmed typically in a relatively high-level programming language. The complexity of a call-center presents a challenge for any programming facility. Moreover, as with any other sort of programming, when a bug appears, or when a change is made in the purpose or functionality of a call center, or portion of call-center operations, it is necessary to laboriously rewrite usually a significant number of scripts. This endeavor is no shallow task, and may take a considerable time. Moreover such reprogramming presents numerous opportunities for error, both in programming as well as in the layout of the script.

Given the nature of directing the activities of call centers in general, and scripting in particular, it is highly desirable to reduce the complexity and work load required to direct the activities of a call center in general, and to script activities in a call center, particularly activities of agents, such as engagement with clients, and also to provide flexibility and adaptability so that changes and adaptations can be easily and quickly made without fear of error. It is also desirable to provide overall management is such a manner that all contingencies are covered, and dead-ends are at worst a remote possibility. The present invention provides just such benefits in call center management and scripting.

SUMMARY OF THE INVENTION

In a preferred embodiment of the present invention a method for programming scripts for directing behavior of a system is provided, comprising steps of (a) selecting Petri Net operator symbols in a graphic user interface (GUI) programmer/editor; (b) placing the symbols in a manner to create a Petri Net directed graph according to desired behavioral constraints for a portion of the system; and (c) compiling an executable software module from the constraints represented by the generated Petri Net according to formality defined within the programmer/editor for the Petri Net directed graph. There may be an additional step for associating Petri Net symbols with domain names, object names, and variables defined for the system whose behavior is to be directed.

The method of the invention is directed in a preferred embodiment, to management of call center systems. In one aspect executable software module compiled from the generated Petri Net and is adapted to provide a displayable script for an agent at an agent station in a telephony call center. Alterations to Petri Net formality are defined in the programmer/editor and utilized in the compilation of executable software modules from the generated Petri Net directed graphs. The Petri Net directed graphs may also incorporate Petri Net hierarchical transitions and Petri Net macroplaces.

Software modules may be compiled following the Petri Net graphs in C++ and other programming languages. In other embodiments a Petri Net engine may be incorporated and control functions provided by directly firing the Petri Nets generated.

For practicing the invention a graphical programmer/editor is provided comprising Petri Net operator symbols adapted to be selected, copied, and placed in a display in a manner to generate a Petri Net directed graph; a stored list associating the operator symbols with functional formality; and a compiler adapted to generate an executable software module from the Petri Net directed graph generated using the stored list of functional formality associated with the operator symbols. In this programmer editor there may also be an input interface adapted for associating operator symbols with domain names, object names, and variables defined for a system whose behavior is to be directed by the executable software module.

In preferred embodiments the software module to be created is a script for directing an agent in a call center in conducting an interview with a client in a telephone conversation. Such scripts in practice are sent to an agent's station to be displayed as an aid in guiding the agent in conducting operations in the call center, such as interacting with a client on a call.

In some embodiments of the invention the operators and functional formality include Petri Net hierarchical transitions and macroplaces. Further alterations to and deviations from formal Petri Net formality may also be defined in the programmer/editor and utilized in the compilation of executable software modules from the generated Petri Net directed graphs.

In an alternative aspect of the invention a method is provided for generating control functions for a system at least partly controllable by software, comprising steps of (a) modeling desired behavior of a portion of the system as a Petri Net directed graph; (b) compiling an executable software module following the formality of the Petri Net directed graph; and (c) executing the software module to provide control for the system. A preferred application is a telephony call center system. In this aspect modeling is accomplished using a graphical user interface (GUI) having selectable Petri Net operator symbols adapted to be copied and arranged as a Petri Net directed graph.

In another aspect a call center is provided, comprising a telephony switch; two or more agent stations each having a computer platform with a video display unit (PC/VDU) and at least one telephone connected by a channel to the telephony switch; a computer telephony integration (CTI) processor connected to the telephony switch by a CTI link and running a CTI application for call center control; and a local area network (LAN) connecting the CTI processor and the PC/VDUs at the agent stations. In this call center some control functions are accomplished by using sensed activity in the call center as inputs to fire a Petri Net directed graph model of at least a portion of the call center and controlling the portion of the call center by commanding elements of the controlled portion to assume states indicated by the firing of the Petri Net directed graph. In such a call center scripts for directing agent behavior may provided by modeling agent behavior as a Petri Net directed graphs, and generating scripts from the Petri Net models.

Petri Net formality is uniquely suited to behavior of such as telephony call centers, by virtue of an ability to handle such behavioral aspects as concurrency. Also, unusual aspects of call centers may be modeled by Petri Net concepts known as hierarchical transitions and macroplaces. The methods and apparatus of the invention provide a unique way to build call center control in a manner that provides flexibility and modularity.

BRIEF DESCRIPTION OF THE DRAWINGS FIGURES

DESCRIPTION OF THE PREFERRED EMBODIMENTS

Figure 1:
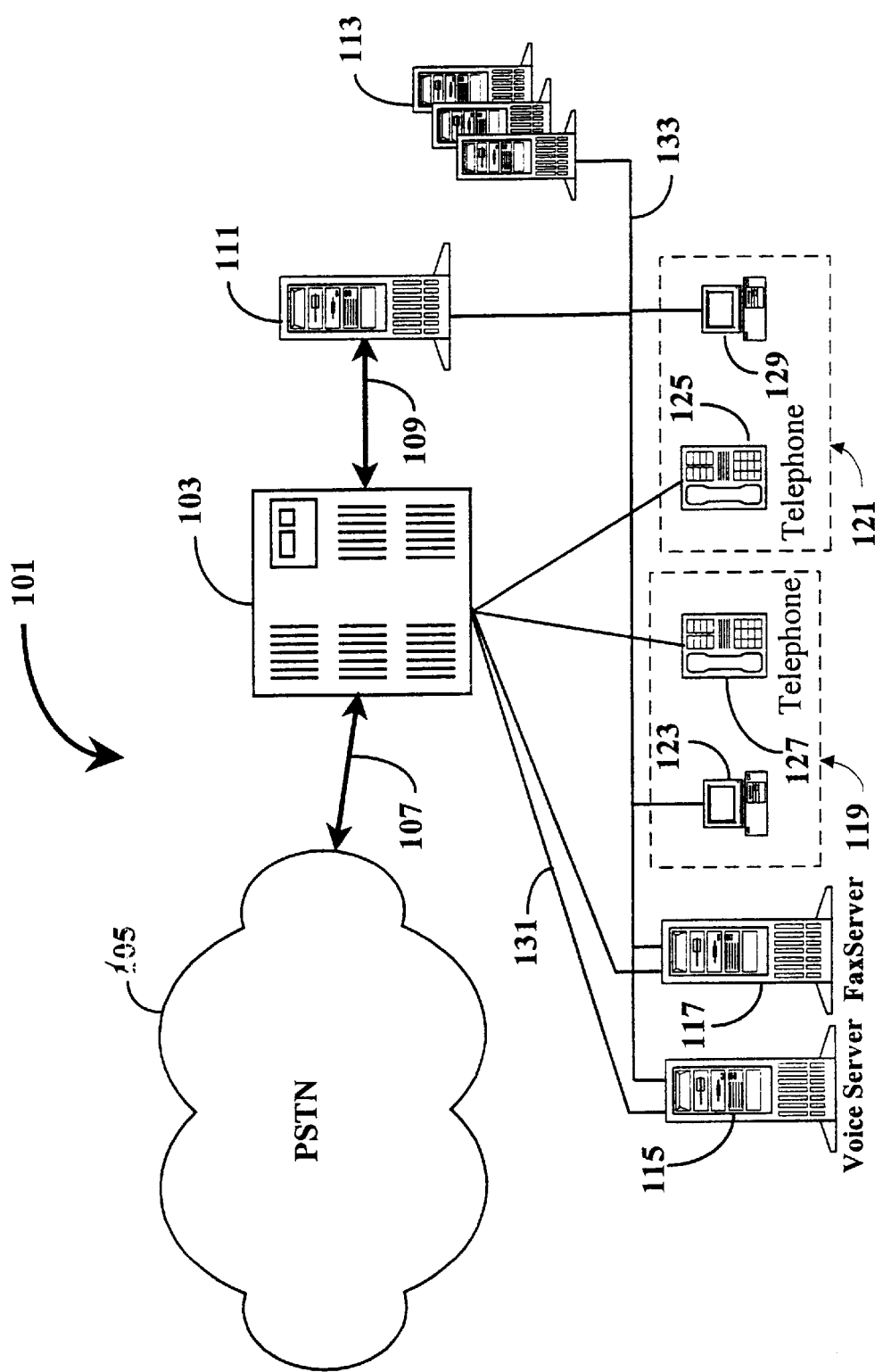
FIG. 1 is a topological representation of a call center in an embodiment of the present invention.

FIG. 1 is a topological representation of a call center 101 in an embodiment of the present invention. A telephony switch 103 is connected by a trunk line 107 to a publicly-switched telephony network (PSTN) 105 and by a CTI-link 109 to a CTI-server 111, which is adapted to execute telephony application software in this embodiment. The call center has a plurality of agent stations, of which two stations, 119 and 121 are shown. Each agent station has a personal computer with a video display unit (PC/VDU), which are identified as elements 123 and 125 respectively, and a telephone. Station 119 has telephone 127 connected by a telephone channel to switch 103 and station 121 has a telephone 125 also connected by a telephone channel to switch 103.

Telephony server (T-S) 111 and each of the PC/VDUs at agent stations are interconnected by a local area network through network connection 133. Also connected on the LAN are a Voice Server 115, a Fax Server 117, and a series of other servers, typically database and application servers, generally represented as servers 113, which may accomplish a variety of functions which may be needed or utilized by the call center. Voice sever 115 and Fax Server 117 are connected to switch 103 by telephone lines as well, and the telephone lines connecting servers and telephones to switch 103 are represented generally as lines 131.

The call center architecture shown in FIG. 1 is simplified for exemplary purposes, and it will be apparent to the skilled artisan that there are a number of variations in the way the equipment may be interconnected, and the numbers and types of equipment illustrated. There may be, example, a large number of agent stations in such a call center. The call center is a set of resources generally defined as equipment and personnel. The equipment includes telephones, fax machines, switches, a LAN, and so forth. The personnel resources include the agents that use the agent stations, supervisors, programmers, technicians, and the like. All communication in the callcenter system is accessed through these resources. From the viewpoint of overall management and applications to accomplish management, the resources can be considered to be objects, and can be classified into resource objects and call objects.

In a preferred embodiment of the invention behavior of all objects is defined and regulated by scenario specifications called scripts, as briefly described in the Background section above. Several objects may be involved in a single script. For example, in a script specifying call processing, there may be several objects processing calls of the same type, and the behavior of all such objects may be dictated by the script. For purposes of further description, a convention is adopted that scripts may have unique names, and there is a domain of object names associated with each script to identify each object within each script.

In a preferred embodiment of the present invention, scripts for management of portions of a call center, and in some cases even for overall call center management, are generated using a front-end language strongly defined on a Petri Net model, defining constraints of Petri Net protocol. In this system the language may be used directly in programming scripts, or code lines and code sequences may be associated with objects in a graphic user interface (GUI), which may employ Petri Net symbols. In other embodiments a Petri Net language may be used. Also in some embodiments portions of a call center, an entire call center, or a network of call centers are controlled by scripts generated on the Petri Net model. In an alternative embodiment, as a logical extension, a Petri Net engine controls execution and control, wherein an overall Petri Net representing the call center(s) is operated on a CTI server, with sensing of occurrences in the call center, reported to the CTI application, acting as conditions for firing transitions in the Petri Net or Petri Nets involved, and events in firing transitions initiating commands to the call center or causing other actions, such as screen pops and the like.

A Petri Net is a graphical representation of a mathematical concept developed for modeling systems generally for the purpose of analyzing system behavior. It is beyond the scope of this patent application to present a complete and formal discussion of Petri Net theory, which is the subject of much theoretical and applied research. The fundamentals of Petri Nets are well-known, and fairly presented in the book "Petri Net Theory and the Modeling of Systems", by James L. Peterson of the University of Texas at Austin. This book is published by Prentice-Hall, Inc. of Englewood Cliffs, N.J., and is incorporated herein by reference. This reference will be referred to henceforth in this specification simply as Peterson. It is not the specific rules of modeling and operation for Petri Nets that is regarded by the inventor as new and non-obvious in the art, but the manner in which Petri Nets are used, and the combination of Petri Nets with telephony systems in unique ways.

In a review of Peterson it will be seen that Petri Nets have been developed to model systems and analyze system behavior. Peterson teaches two approaches to the use of Petri Nets relative to systems. One is in system analysis, wherein one observes an existing system and then reduces the system to a Petri Net. The resulting Petri Net is then used for system analysis, and things learned may be translated into system improvements, for example. A second approach taught by Peterson is for system design. In this use, one designs a system entirely by developing the analogous Petri Net, then translates the Petri Net by definition into the analogous system.

In the present invention the inventor proposes new and unique uses for Petri Nets. In one embodiment a script generation system uses a front end language strongly influenced by Petri Net protocol, which may be a GUI based on Petri Nets coupled to a compiler to generate scripts for a call center. In this embodiment particular characteristics of Petri Nets, such as the ability of Petri Nets to handle concurrency and Conflict situations are built into generated scripts particularly suited to call center operations. In an alternative embodiment scripts are generated in a Petri net language and the Petri Nets generated are operated in a Petri Net engine to accomplish overall and modular system management.

Hierarchical Transitions and Macroplaces

In a call center operation, control of which is an object of the present invention, when a call is connected to an agent at an agent station, a script is typically sent to the agent for directing the agent's activities while engaged with the client (caller). Depending on the nature and purpose of the call center, there may be a wide variety of possibilities and contingencies to be covered.

A problem with controlling activities in a particular place in a formal Petri Net model, however, is that there is no allowance in simple Petri Nets for such diversion in operation of the overall Net. In a preferred embodiment of the present invention, this contingency is provided through concepts of Hierarchical Transitions, Macroplaces, and Subnets. All of these concepts are known in the art of Petri Nets, and have been described in reference works in possession of the inventor and available to the public. In the case of Hierarchical Transitions, the concept is fully described in the treatment of High Level Petri Nets of K. Jensen in *Coloured Petri Nets. Basic concepts, analysis methods and practical use*. Vol 1: Basic Concepts, EATCS Monograph on Theoretical Computer Science, Springer Vertag, 1992.

All of the treatment of hierarchical transitions in the reference provided is beyond the need and scope of this specification. Generally, the idea of hierarchical transitions is that a Net can be represented as a set of disjoint subnets with links between transitions and subnets forming a hierarchical structure. Firing of a hierarchical transition results in execution of an internal net that results in a step sequence from an initial marking to a terminal one. Using this technique the inventor represents a call center as a Petri Net having a plurality of hierarchical transitions allowing execution of subnets at selected points in the higher level net, and return to the higher level net after execution of a subnet.

It will apparent to the skilled artisan that the use of hierarchical nets wherein formal subnets may be executed may not be adequate for representing all of the contemplated activities of an agent at an agent station. There are many things that may happen in the progress of a call other than smooth progression to a logical conclusion. A call may be suddenly disconnected for example, or a client may hang up. Information may surface requiring that a call be transferred to a different agent, or even to a different call center. Many other interruptions and perturbations are possible.

To provide for the. existence of interruptions and the like, a concept somewhat similar to hierarchical nets is adopted for representing the complex operations, particularly at agent stations, in a call center. This is the concept and formality of Macronets and Macroplaces. Macronets and Macroplaces are treated in A. Anisimov, *An Algebra of Regular Macronets for Formal Specification of Communication Protocols, Computers and Artificial Intelligence*. Vol 10. No. 1. 1991, pp 541–560.

In Macronets, execution of one procedure may be interrupted by starting execution of another procedure. A Macronet has places, which are Macroplaces, having included subnets. A macroplace may be perceived as a set of included Petri Nets, each internal net being drawn within a circle of corresponding macroplaces. The internal net of a macroplace has a head place marked by an incoming extra arc. Firing rules for macroplaces are: (1) A macroplace is considered to have a token only if its internal net also has a token (2) Adding a token to a macroplace results in adding a token to the head place of the internal net and (3) removing a token from a macroplace results in removing a token from the internal net, no matter what position it is in.

Generation of Scripts by Petri Net Formality

Figure 2:
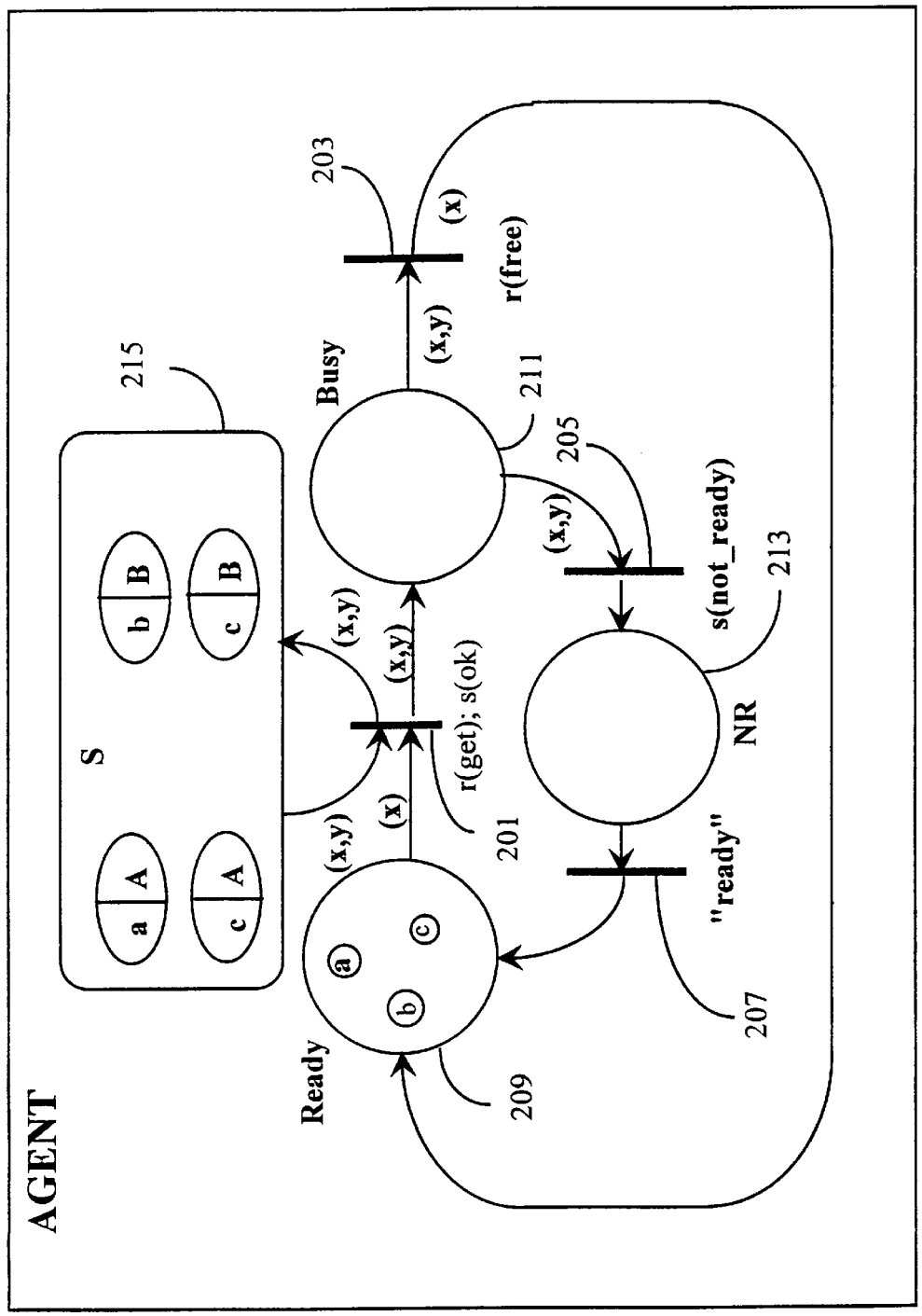
FIG. 2 is an example of a simple Petri Net system, illustrating some of the principles of Petri Nets as applied to objects in call centers.

In a preferred embodiment of the present invention, as described briefly above, a front end language based on Petri Net formality, which may be a GUI system, is used to generate scripts for call center operations. FIG. 2 illustrates a display useful in this embodiment for generating such scripts. In the directed graph shown in FIG. 2, as is known for Petri Nets in general, transitions are represented by bars, and four transition bars 201, 203, 205, and 207 are represented. As is also well-known for Petri Nets, places are represented by geometrical figures, typically circles. Places 209, 211, 213, and 215 are represented here.

Although not shown on the display of FIG. 2, an operator will have a toolbar for selecting operators to be placed, in the Petri Net. The technique is one well-known in the art. For example, an operator/programmer would use a cursor to select an operator, such as a place or transition icon, and to drag an instance of the operator into the diagram and position it. Tools graphic tools are provided as well for placing the necessary "arcs", which are the directed lines in a developing script net.

At any point in the development of a script a programmer may select an operator, such as a place, and initiate input fields for relating such operators to object names in a system, and to input other necessary variables. These sorts of operations are also well known in graphics and programming arts. Tokens may then be placed as a beginning state for the developed net.

The Script Net of FIG. 2 is an example of a net useful for a subset of operations in a call center. The purpose of this script net is to select agents to handle incoming calls, and to direct the calls to agents capable, by individual skill set, of handling the calls. In the net, lower case letters represent agents. Upper case letters represent callable scripts (not necessarily script nets) that may be retrieved from a database and sent to an agent station to direct an agent's operations.

There may be any number of agents in the call center, but in this example, agents have one of three skill sets, represented by the agent's ability to interact with a client (caller) following one of the callable scripts A or B. Agents "a" can work with script A, agents "b" can work with script B, and agents "c" can work with either script A or B.

In the script net of FIG. 2 any agent can be in one of three states, represented by places 209 "ready", 211 "busy", and 213 "not ready". The transition from Ready to Busy is caused by receiving a command "get" and sending a reply "ok". In a Busy state an agent can move to a Ready state by receiving a command from the application. Moreover, in a busy state the agent can move to a Not-Ready state (e.g. switching to more urgent work) informing the application by sending a command "not-ready". From the "not-ready"0 the agent can also return to the "Ready" state by informing the application.

The script net of FIG. 2 tightly constrains, under the given circumstances, the conditions under which an agent may change states (the inputs) and constrains also the sending of appropriate scripts to the appropriate agents when calls are transferred to the agents.

Figure 3:
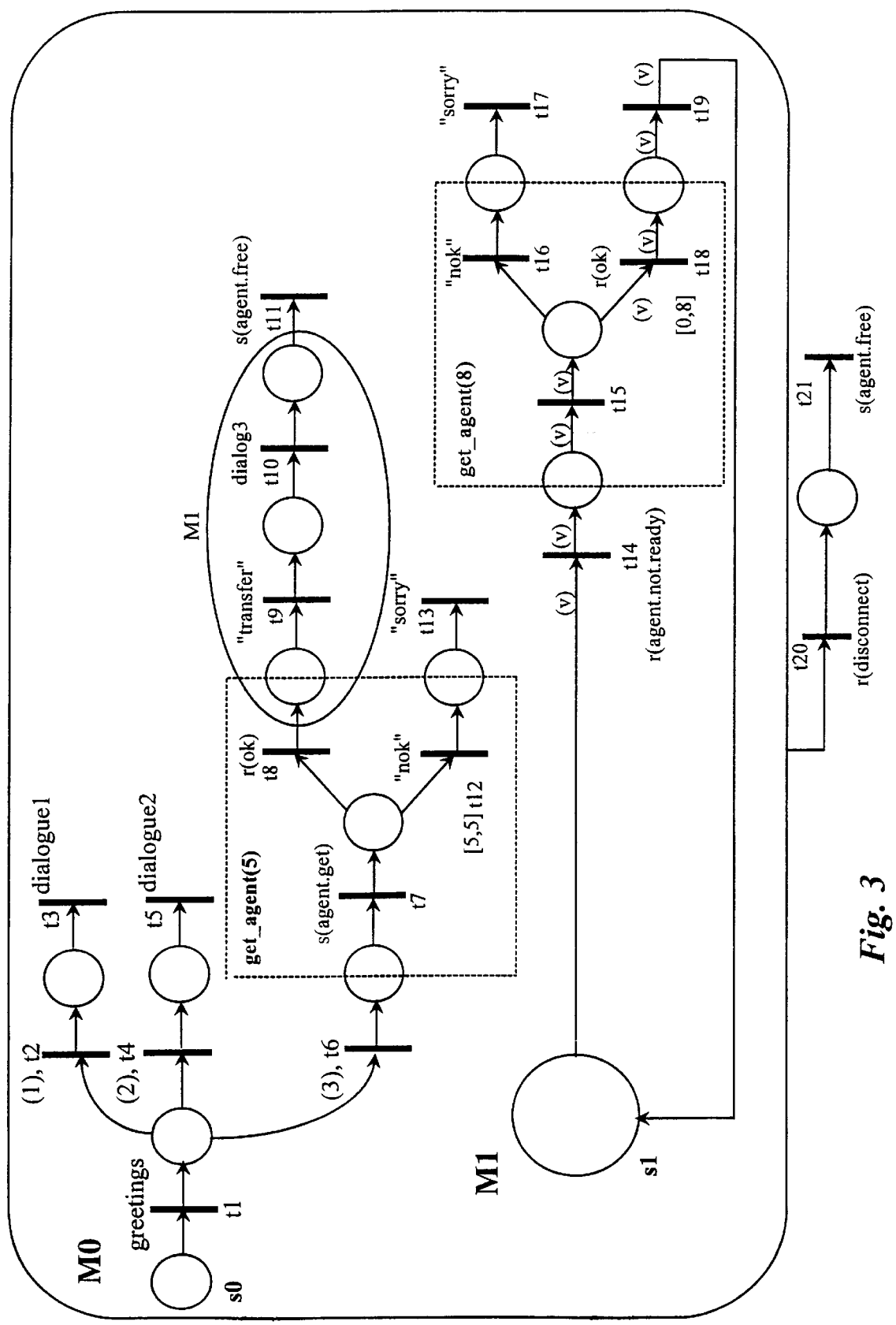
FIG. 3 is another example of a Petri Net developed for management in a call center.

FIG. 3 is another example of a script-net developed by GUI techniques, using Petri Net formality including hierarchical transitions and macroplaces.

The script net of FIG. 3 is a script for processing calls in a call center dedicated to catalogue sales. Calls can be of various types, some of which require a dialogue with an agent at the call center, and some of which may be handled by an Interactive Voice Response (IVR) system. For example, a customer telephones the call center wishing to find out about availability of items in a catalogue, status of an order, delivery options, and so forth. Calls of this type may be readily handled by IVR. However, calls from new customers who will require special assistance, from repeat and steady customers who prefer a human interface, and the like will need to be transferred to an agent.

When a call arrives a token appears in head place s0, which provides input to fire transition t1. A greeting is played to the caller, and the caller is offered a choice of pressing "1" on his/her touchtone phone for checking availability of items from the catalogue, "2" for status of an order previously places, or "3" for other types of calls.

In cases "1" and "2" the client is transferred to IVR. If the client returns "1" that return is used as an input to fire transition t2, and the call is transferred to a first IVR which interacts with the customer concerning availability of items. This interaction is shown in the script net as dialogue at t3. The actual dialogue with the IVR will comprise offering the client further menu choices and the like, as is well-known in the art, so no detail is here provided.

If the client returns "2", that return is used as an input to fire t4, and the call is transferred to a second IVR, which interacts with the client to provide order status. The interaction is labeled dialogue2 at t5.

If the client returns "3", that return is used as input for t6, and a routine s(agent get) is called at t7 to capture an agent to interact with the client. The actual procedure is for a command "get" to be sent to the script defining agent behavior. If an agent is captured the agent script returns "ok" at t8. The agent get routine is a function of the CTI server, and may take a number of forms. In a simple case agent get may simply cause the call to be transferred to any available agent. Agent availability is determined by the management system by a query to a database on the LAN (FIG. 1) wherein agent login and logout are recorded, and agent status (Busy, Not Busy, for example) is maintained. In more sophisticated systems, agents may be selected also by skill set matched to requirements for a call. Some agents, for example, may be competent to handle calls about certain parts of the catalogue, but not all parts.

If an agent is captured the call is transferred to the agent at t9 and then the agent to whom the call is transferred interacts with the client at t10. At the end of the conversation the operator is released at t11.

If the command "get" at t7 fails to return "ok" at t8 in a defined time frame, or, in another aspect returns "nok" (for not ok) at t12, then the call is transferred to an IVR to play an apology to the client. This eventuality is, of course, just one of several possibilities. In some cases, for example, not shown here, the call may be returned to a queue with a recorded explanation to the client, and another attempt later made to handle the call.

Consider the case now wherein a call is transferred to an agent, and the call is interrupted, such as by the agent pressing a button "not ready". The agent becomes immediately unavailable, and the call is interrupted. It is desirable, however, that the call not be just peremptorily lost. Macroplace M1 designed for handling this eventuality is, for the sake of clarity, shown as a separate construct.

In the situation just described, wherein a call is interrupted, a token appears in the head place s1 of macroplace M1. This token provides the input for t14, and the state where the call processing was interrupted is saved as variable v. At t15 an attempt is made to find another agent, that is, a new command "get" is sent to the agent script, and a response "ok" or "nok" is looked for. If the response is "nok" at t16 the call is switched to an IVR which apologizes to the client and asks the client to please try to place a call again later, or similar message. If an acceptable alternative agent is captured at t18 the call is switched to that agent, the variable v is accessed, and the script for the new agent is commenced (t19) at the point where it was interrupted for the original agent.

Another eventuality is covered by the script net of FIG. 3. This is the eventuality of the client interrupting the call, such as by suddenly hanging up. This eventuality is covered by the firing of t20. The execution of the script is disrupted, the agent (if any were captured and engaged in the call) is released at t21, and the call processing is terminated.

FIGS. 2 and 3 described in detail above should be sufficient to illustrate to the skilled artisan the nature of script nets that may be produced for call center management by use of a front-end tool strongly bases on Petri Net protocol according to embodiments of the present invention. As previously described, a programmer, familiar with the nature of the control wanted, builds the Script Net using the GUI, then the Script Net produced may be tested and compiled in C++ or whatever other language may be in use for call center management by the CTI server running on processor 111 of FIG. 1, for example.

Figure 4:
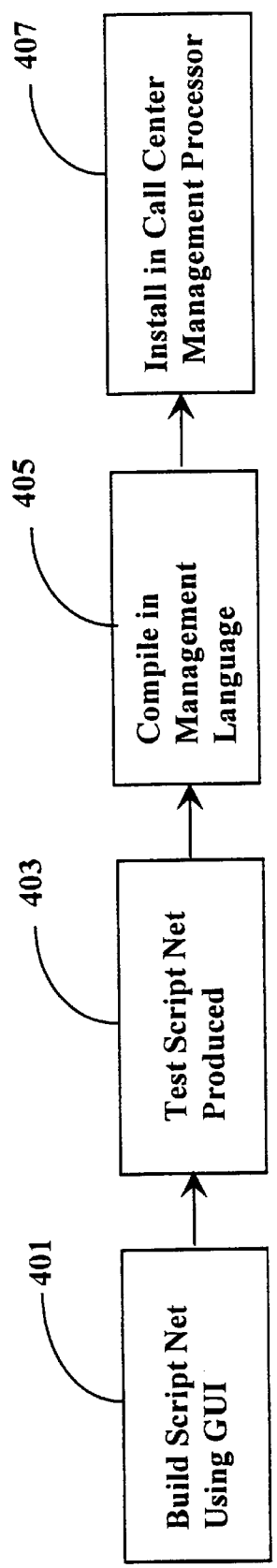
FIG. 4 is a method flow chart for software module development in n embodiment of the present invention.

The overall process of Script Net production is illustrated in FIG. 4. A new Script Net is produced at step 401, the Script Net is tested and confirmed at step 403, the Script Net is compiled in a suitable language for integration with a call center management software suite at step 405, and the new software unit is installed at step 407.

Operation by Petri Net

In an alternative aspect of the present invention, call center management is accomplished by directly operating a comprehensive Petri Net, and new and alternative modules are added to the overall net in the manner described above. This alternative requires a Petri Net engine, and modeling of the entire call center as a Petri Net, making use of hierarchical transitions and macroplaces as already described herein. The technique in much simplified form is illustrated in the descriptions that follow, alluding to FIGS. 5 and 6.

Figure 5:
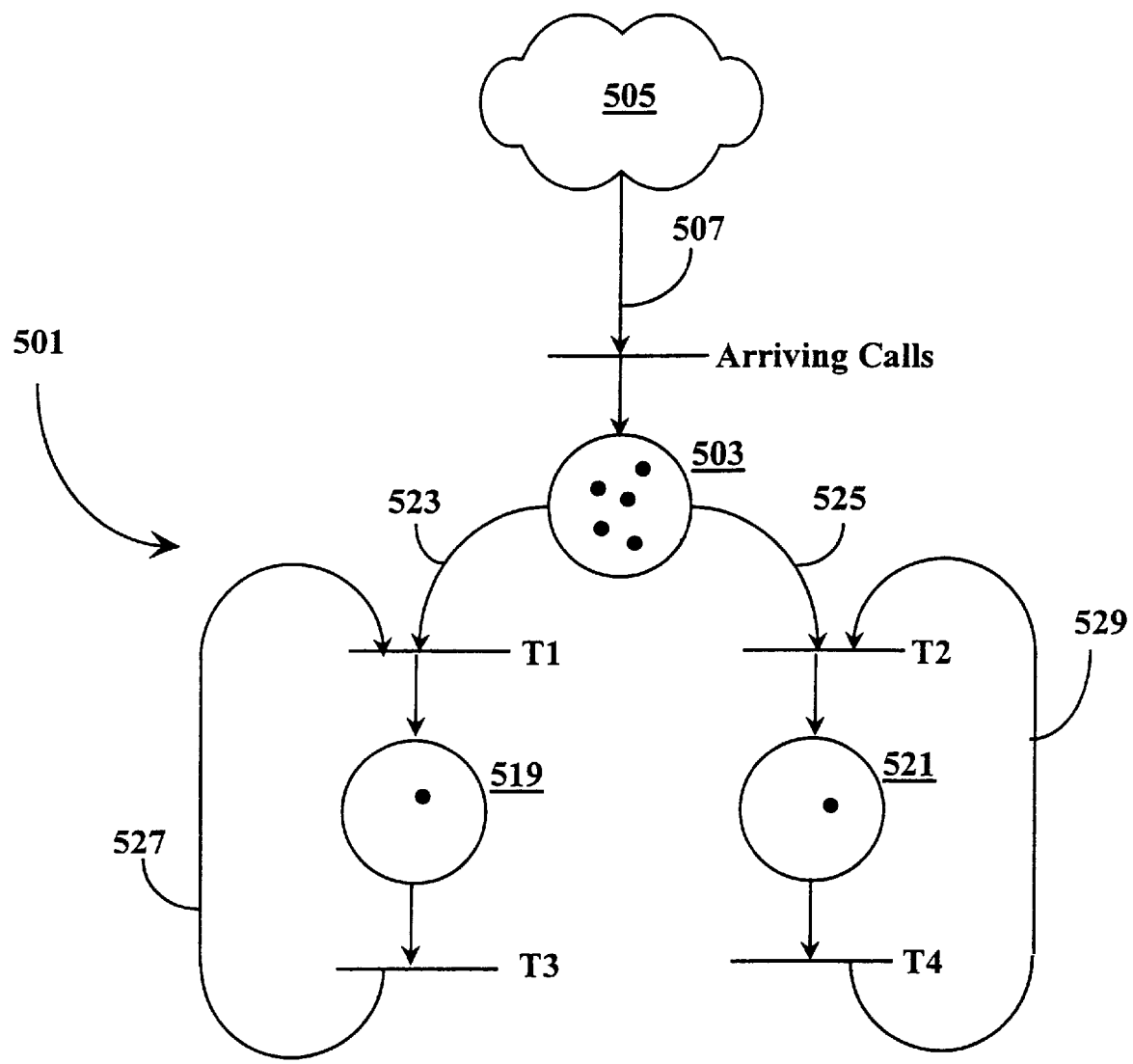
FIG. 5 is a simplified Petri Net conforming to a call center model.

FIG. 1, as described above, is one example of a generalized call center. FIG. 5 is a simple Petri Net directed graph representing the simplified and generalized call center of FIG. 1. In FIG. 5, calls directed by whatever methodology from PSTN 505, represented by vector 507, arrive at switch 503, where, in this example, calls are queued for distribution to agent stations, in this example, agent stations 519 and 521. It is emphasized here that agent stations 519 and 521 are equivalent to station 119 and 121 of FIG. 1, and place 503 is equivalent to switch 103 of FIG. 1.

In the formality of Petri Nets, places are represented by circles, such as switch 503, and agent stations 519 and 521. Transitions are represented by bars, such as transitions T1–T4 in the Petri Net diagram of FIG. 5. Places and transitions in a Petri Net graph are connected by arcs. An arc has direction, as indicated by an arrowhead, and can be represented as an arc or a straight line, or by any connecting line or curve. Arcs from a place to a transition are input arcs. Arcs from transitions to places are output arcs.

Any system can have a multiplicity of states, which are represented in a Petri Net graph by location of tokens. The tokens are an abstraction for an object of a system. In a Petri Net graph representing a system for machining parts, for example, a token may represent a part moving through various machining stages, where the places may be different machines. In a Petri Net graph representing a mail room, tokens may represent packages in various stages of processing before shipment. In our call center, tokens conveniently represent calls.

Different states of the Petri Net are represented by location of tokens, which are shown as dots in places. Changes in state in a Petri Net graph are accomplished by firing transitions. For a transition to fire, inputs have to be satisfied.

In this example of a call center, tokens represent calls. In FIG. 5, calls directed by whatever methodology from PSTN 505, represented by vector 507, arrive at switch 503, where, in this example, calls are queued for distribution to agent stations 519 and 521. In this example all calls are accepted, and queued in switch 503. Calls that have arrived are represented as tokens (of which in the current state there are 5) in place 503. An input arc 523 proceeds from place (switch) 503 to transition T2, which represents transfer of a call to agent station 519. In like manner an input arc 525 proceeds from place 503 to transition T2, which represents transfer of calls from place 503 to agent station 521.

In the present state, a call is seen as in progress at each of agent stations 519 and 521. As long as there is a token in place 519, T1 cannot fire, and no additional token may be transferred to place 519. When a call is completed at place 519, however, transition T3 fires, removing the token from place 519, and providing an input to transition T1, represented by arc 527.

It may be readily seen that two inputs must be satisfied to fire transition T1. One is that the previous call is completed (transition T3 fired, and the other is that there is a token in place 503 (there is a call in the queue waiting to be transferred). If there is a call in progress (token) in place 519, or there is no call (token) in place 503, no call can be transferred.

The connectivity and functionality described for agent station 519 is repeated for agent station 521, represented by arc 525, transition T2 and T4, and arc 529. The operation of the simple call center of FIG. 1, then, is adequately represented by the Petri Net graph of FIG. 5. Arriving calls are queued and directed to agent stations 519 and 521 as calls are available and agents are available. The actual processing of a call, and the time that might be required is not represented, and is taken into account in the firing of transitions by inputs not shown. This aspect is taught in more detail below, and is accomplished by the inclusion in the net of such as hierarchical transitions and macroplaces, much of which has already been described above.

It will be apparent to the skilled artisan that this is a very simple example. There may be two or more telephones at each agent station, for example, and calls may be directed to any telephone. There may also be many agent stations in a call center. The agent station may also be equipped with a PC, and agent's PCs may be connected on a LAN, which may also be connected to a processor monitoring and directing switch 503. Agents may have fax machines and other equipment, and may be enabled to handle Internet Protocol Network Telephony (IPNT) calls. The operations involved in processing calls (interacting with clients) may be quite complex. Moreover, agent's responsibilities may not all be uniform. Some agents may be trained and qualified for some tasks, and other agents for other tasks. Calls of some sorts, or from some clients, may be reserved for special agents, who may be required to follow special protocols. Some of these issues, particularly the intricate operations involved in agent's activities, have been described above.

In the traditional and conventional uses of Petri Nets, a Petri Net model may be made of an existing call center, and analysis of the model in various states may serve to elucidate actual operations of the call center, and provide clues and directions for improvements in operation of the call center. Alternatively, one might design a call center by designing first a Petri Net and then building a call center after the model.

In one aspect of the present invention, a Petri Net model is implemented in a processor, and a Petri Net engine fires the transitions of the Petri Net as conditions are satisfied. Conditions are enabled by sensing switch 103 (FIG. 1) and by various other inputs, some of which may be manual inputs provided by agents. Actual transfer of calls is predicated by sending commands to the switch by the CTI application running on processor 111, following changes in state of the Petri Net (FIG. 5) running the call center. The firing of the Petri Net controls and sequences operation of the call center in this manner. In a sense, the Petri Net in this instance is tied directly, element for element, with the actual call center. When a transition fires in the Petri Net model, and a token is removed from one place and a new token caused to appear at one or more other places, a call in the actual call center is transferred. Firing of transitions in the controlling Petri Net for a call center may also initiate and manage many other functions of a call center.

In the call center example described above, wherein a Petri Net system, through inputs and firing of transitions, and resulting manipulation of tokens, manages activities in the call center, the operation of the controlling Petri Net is a part of a CTI application executing on processor 111 of FIG. 1. In a very general sense, the Petri Net system of FIG. 5 may be considered as running on processor 111. A CTI application running on processor 111 is capable of directing all of the functions of switch 103, such as connecting queued calls to destination numbers (DNs), which are ports to which agent's telephones are connected. Also, the CTI application is capable of monitoring all activity at the switch, and through the switch and the PCs connected on LAN 133 the activities of hardware at agent stations. Each time a call arrives at switch 103, indication of the call is sent to the CTI application running the Petri Net, and a new token is added to place 503 (FIG. 5) representing another call queued in switch 103. Through the two-way cooperation between the CTI application executing the managing Petri Net and the switch through CTI link 109, the call center may be managed by a rigid set of formal rules.

It was mentioned above that activities at any agent station in a call center may be quite complex, not all agent stations will not be alike, and not all agents will have the same skill set and responsibilities in a call center. The very simple, exemplary, managing Petri Net of FIG. 5 makes no provision for such contingencies. In an aspect of the present invention, activities of agents at agent stations are controlled through scripts provided by the controlling CTI application to agent stations. Scripts in the broadest sense can take many forms. In a simple form a script may be a list of suggestions (or commands) retrieved from a database under a particular circumstance, and provided as a screen pop, via LAN 133, to a display monitor of an agent's PC, such as PC 123 at agent station 119. In a more complex form, a script can involve many other elements (objects), such as physical constraints on hardware at an agent's station, screen pops as described above, recorded voice responses or additions to an agent's part of a conversation, and much more. The inventors have found that all of these activities may also be represented by, and controlled through, Petri Net execution.

Figure 6:
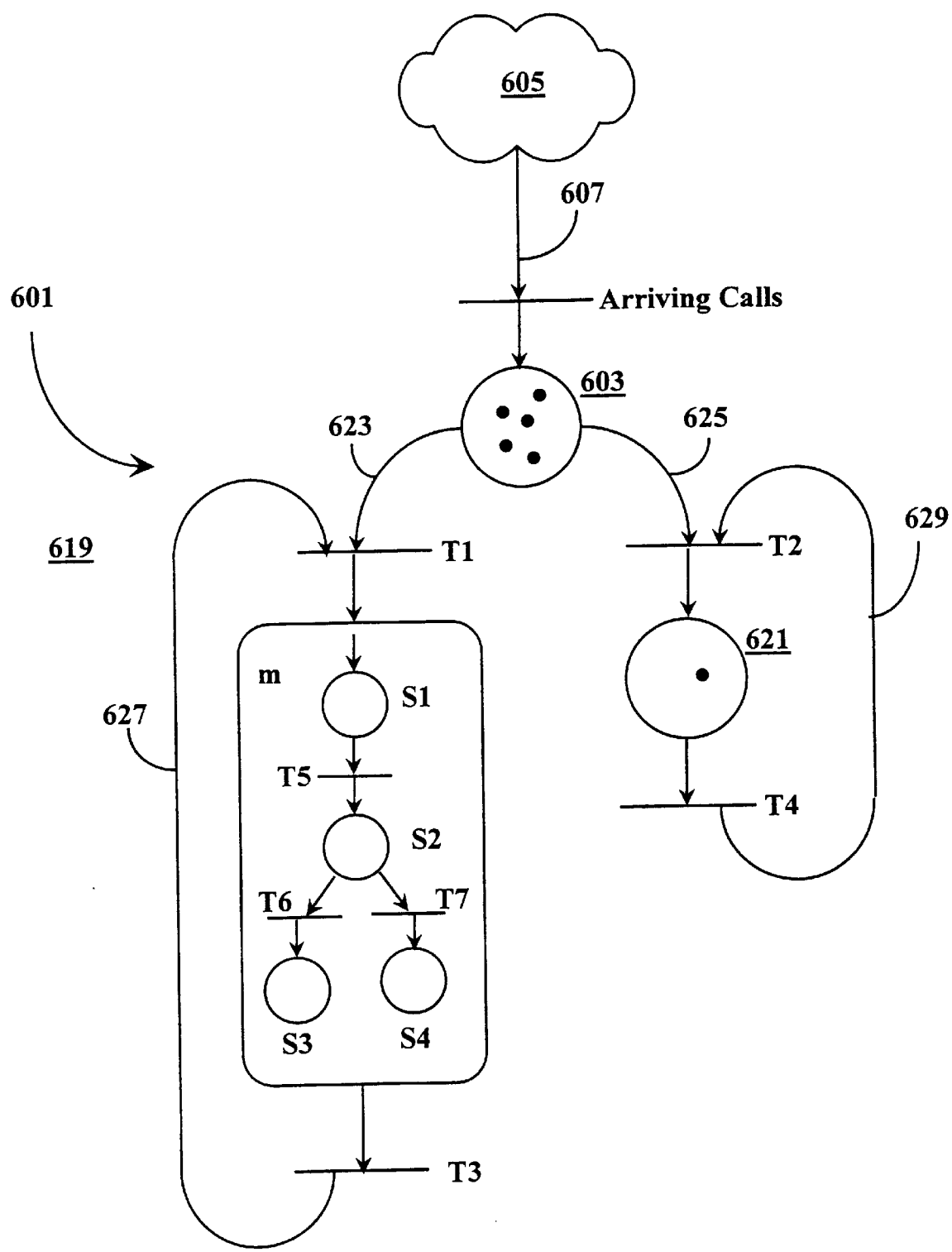
FIG. 6 is a more detailed extension of the Petri Net of FIG. 5.

FIG. 6 is an expanded version of the Petri Net of FIG. 5, wherein one of the places, specifically the place 619 representing agent station 119 of FIG. 1, is a macroplace m. It is emphasized again the correspondence between agent stations and the switch in FIGS. 1, 5, and 6.

In macroplace m, a subnet has places S1–S4, and transitions T5–T7. When a token is placed in macroplace m in this example, the token appears in the internal subnet at the head place, which in this example may be place S1. Note that the internal subnet may be simple sequential net, wherein a token in the head place will result in firing transition T5, placing a token in S2, which fires both transitions T6 and T7, moving a token into both S3 and S4. Each of these actions can represent a function controllable at agent station 119, and, through execution of the macronet in the CTI application at processor 111, the activity at the agent station each time a call arrives may be orchestrated.

The subnet representation of m in FIG. 6 is merely exemplary. Internal subnets may, of course, be much more complex than that shown. There is also no requirement that any subnet have a single token moving through the subnet. Nets can be provided in a macroplace requiring that two or more tokens be moved to the macroplace before any transition fires in the subnet, for example.

For the contingency of interrupted calls and procedures at an agent station the concept of Macronets and Macroplaces is extended such that internal execution of an included subnet may be interrupted only in certain specified regions, and head place can be specified dynamically, so an interrupted procedure may be restarted at the point of interruption; that is, a token may be injected at any point in the subnet. This ability was described above, and is not extended upon here.

With the aid of extended Macroplaces one may easily specify the next situation in an agent's scenario. For example, script execution, represented by a subnet, may be interrupted, with an apology to the client, at any stage with subsequent return to an initial state. In this case processing of an interrupted call is canceled. Also interruption of script execution can be limited to just certain regions or places in a script. Further, a script may be interrupted, the place of interruption marked, current parameters saved, and processing of the call later recommenced at the place of interruption.

In another aspect of the present invention, Petri Nets are extended beyond localized call center management to management of call networks. In this aspect the networks can be of any known sort, such as PSTN, private exchange intelligent networks, wide area networks such as the Internet, and so on. The techniques are essentially the same as described above relative to call center-management. A usually centralized overall management software suite provides management, with software modules interacting and exchanging commands and data and the like. Individual modules are created via a Petri Net GUI, and the resulting directed graphs are converted to CTI applications in another language compatible with the overall software suite by a compiler. Alternatively the entire management process is by firing a high-level Petri Net using a Petri Net engine, and individual modules are created by the GUI and placed in operation in the higher-level net.

It will be apparent to the skilled artisan that there are many alterations that might be made in the preferred embodiments described without departing from the spirit and scope of the invention. For example, individual examples herein are relatively simple, so as to not obscure the important features of the invention in the several aspects and embodiments. As another example, it is well-known in the software arts that individual programmers often have preferences in coding, and there are often several ways that one distinct feature may be rendered in software. The same is true in Petri Net programming. There are often variations in a directed graph that will accomplish the same operational features, and the variations do not necessarily place equivalent methods and apparatus beyond the scope of the invention. The scope of the invention is limited only by the claims which follow.

What is claimed is:

1. A method for programming scripts for directing behavior of an Internet Protocol Network Telephony (IPNT) call center, comprising steps of:
    (a) selecting Petri Net operator symbols in a graphic user interface (GUI) programmer/editor;
    (b) placing the symbols in a manner to create a Petri Net directed graph according to desired behavioral constraints for a portion of the system; and
    (c) compiling an executable software module from the constraints represented by the generated Petri Net according to formality defined within the programmer/editor for the Petri Net directed graph.

2. The method of claim 1 further comprising a step for associating Petri Net symbols with domain names, object names, and variables defined for the system whose behavior is to be directed.

3. The method of claim 1 wherein the executable software module compiled from the generated Petri Net is adapted to provide a displayable script for an agent at an agent station in the telephony call center.

4. The method of claim 1 wherein alterations to Petri Net formality are defined in the programmer/editor and utilized in the compilation of executable software modules from the generated Petri Net directed graphs.

5. The method of claim 2 wherein Petri Net hierarchical transitions and Petri Net macroplaces are incorporated in the steps for selecting and associating operators.

6. The method of claim 1 wherein the executable software module is compiled in C++.

7. The method of claim 1 wherein the executable software module is a Petri Net module adapted to be executed by a Petri Net engine.

8. A graphical programmer/editor comprising:
    Petri Net operator symbols adapted to be selected, copied, and placed in a display in a manner to generate a Petri Net directed graph;
    a stored list associating the operator symbols with functional formality; and
    a compiler adapted to generate an executable software module from the Petri Net directed graph generated using the stored list of functional formality associated with the operator symbols;
    wherein the software module to be generated is a script for directing an agent in an Internet Protocol Network Telephony (IPNT) call center in conducting an interview with a client in an IPNT telephone conversation.

9. The graphical programmer/editor of claim 8 further comprising an input interface adapted for associating operator symbols with domain names, object names, and variables defined for a system whose behavior is to be directed by the executable software module.

10. The graphical programmer/editor of claim 8 wherein the operators and functional formality include Petri Net hierarchical transitions and macroplaces.

11. The graphical programmer/editor of claim 8 wherein alterations to Petri Net formality are defined in the programmer/editor and utilized in the compilation of executable software modules from the generated Petri Net directed graphs.

12. A method for providing control functions for an Internet Protocol Network Telephony (IPNT) call-center system at least partly controllable by software, comprising steps of:

(a) modeling desired behavior of a portion of the system as a Petri Net directed graph;

(b) compiling an executable software module following the formality of the Petri Net directed graph; and (c) executing the software module to provide control for the system.

13. The method of claim 12 wherein, in step (a) the modeling is accomplished using a graphical user interface (GUI) having selectable Petri Net operator symbols adapted to be copied and arranged as a Petri Net directed graph.

14. An Internet Protocol Network Telephony (IPNT) call center comprising:

an IPNT switching router;

two or more agent stations each having a computer platform with a video display unit (PC/VDU) and at least one telephone connected by a channel to the telephony switch, enabled to handle IPNT calls;

a computer telephony integration (CTI) processor connected to the IPNT router by a CTI link and running a CTI application for call center control; and a local area network (LAN) connecting the CTI processor and the PC/VDUs at the agent stations;

wherein some control functions are accomplished by using sensed activity in the call center as inputs to fire a Petri Net directed graph model of at least a portion of the IPNT call center and controlling the portion of the IPNT call center by commanding elements of the controlled portion to assume states indicated by the firing of the Petri Net directed graph.

15. The call center of claim 14 wherein scripts for directing agent behavior are provided by modeling agent behavior as Petri Net directed graphs, and generating scripts from the Petri Net models.

* * * * *